US010112217B2

(12) United States Patent
Li et al.

(10) Patent No.: US 10,112,217 B2
(45) Date of Patent: Oct. 30, 2018

(54) SYSTEM AND METHOD TO PROCESS RETURN-TO-SENDER (RTS) MAIL

(71) Applicant: Siemens Industry, Inc., Alpharetta, GA (US)

(72) Inventors: Hongjian Li, Coppell, TX (US); Abdul Hamid Salemizadeh, Burleson, TX (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 0 days.

(21) Appl. No.: 15/457,430

(22) Filed: Mar. 13, 2017

(65) Prior Publication Data

US 2018/0029084 A1 Feb. 1, 2018

Related U.S. Application Data

(60) Provisional application No. 62/368,398, filed on Jul. 29, 2016.

(51) Int. Cl.
*G06K 9/00* (2006.01)
*B07C 3/18* (2006.01)
*B07C 3/14* (2006.01)

(52) U.S. Cl.
CPC .................. *B07C 3/18* (2013.01); *B07C 3/14* (2013.01); *B07C 2301/005* (2013.01)

(58) Field of Classification Search
CPC ........ B07C 3/14; B07C 3/18; B07C 2301/005
USPC ........................................ 209/552, 583, 584
See application file for complete search history.

(56) References Cited

U.S. PATENT DOCUMENTS 8,674,252 B2 * 3/2014 Tresse ........................ B07C 3/00 209/583
2003/0045945 A1 * 3/2003 Lopez ........................ B07C 3/14 700/2
2003/0116482 A1 * 6/2003 Steinmetz ................. B07C 3/14 209/584
2004/0007510 A1 * 1/2004 Kechel ....................... B07C 3/00 209/584
2005/0049890 A1 * 3/2005 Kan ................... G06Q 10/0837 705/408
2006/0283784 A1 * 12/2006 Roth .......................... B07C 3/00 209/584
2013/0299578 A1 * 11/2013 Ahmed ................ B07C 5/3412 235/385

FOREIGN PATENT DOCUMENTS

DE 19705891 C1 * 3/1998 ............... B07C 3/00

* cited by examiner

*Primary Examiner* — Terrell H Matthews

(57) ABSTRACT

A method for processing return-to-sender (RTS) mail pieces by a mail processing system. The method includes receiving a plurality of RTS cards and RTS mail pieces. The RTS cards identify RTS reason codes for corresponding ones of the RTS mail pieces. The method includes imaging each RTS mail piece to produce an image. The method includes creating and storing a unique RTS mail piece profile of for each "error" RTS mail piece that uses an identification code for that RTS mail piece and a reason code from a preceding RTS card. The method includes sorting the RTS cards to a first output bin and sorting the error RTS mail pieces to a second output bin. The method includes thereafter processing the error RTS mail pieces using the corresponding RTS mail piece profiles and without using the RTS cards.

14 Claims, 4 Drawing Sheets

SYSTEM AND METHOD TO PROCESS RETURN-TO-SENDER (RTS) MAIL

CROSS-REFERENCE TO RELATED APPLICATION

This application claims the benefit of the filing date of U.S. Provisional Patent Application 62/368,398, filed Jul. 29, 2016, which is hereby incorporated by reference.

TECHNICAL FIELD

Aspects of the present invention generally relates to managing RTS separator card reason codes and RTS mail via an image management system (IMS) when the RTS mail is processed on a mail processing equipment (MPE).

BACKGROUND OF THE DISCLOSURE

Mail-carrier-identified Return-to-Sender (RTS) is one category of mail classified as Undeliverable-As-Addressed (UAA). This specific UAA type mail is operationally the most costly type of UAA mail processed by the postal organization because it goes undetected by all automation equipment, and is shipped to the final postal facility responsible for the physical delivery of the mail to the addressed recipient. The mail is then identified as RTS mail by the mail carrier at the Delivery Unit (DU). Once identified as RTS mail, additional automation processing is performed, and improved processing is desirable.

SUMMARY OF THE DISCLOSURE

Disclosed embodiments relate to systems and methods for processing return-to-sender (RTS) mail pieces by a mail processing system. A method includes receiving a plurality of RTS cards and RTS mail pieces. The RTS cards identify RTS reason codes for corresponding RTS mail pieces. The method includes imaging each RTS mail piece to produce an image. The method includes creating and storing a unique RTS mail piece profile for each "error" RTS mail piece. These RTS mail piece profiles use an identification code for the corresponding RTS mail piece and a reason code from the preceding RTS card. The method includes sorting the RTS cards to a first output bin and sorting the error RTS mail pieces to a second output bin. The method includes thereafter processing the error RTS mail pieces using the corresponding RTS mail piece profiles and without using the physical RTS cards.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
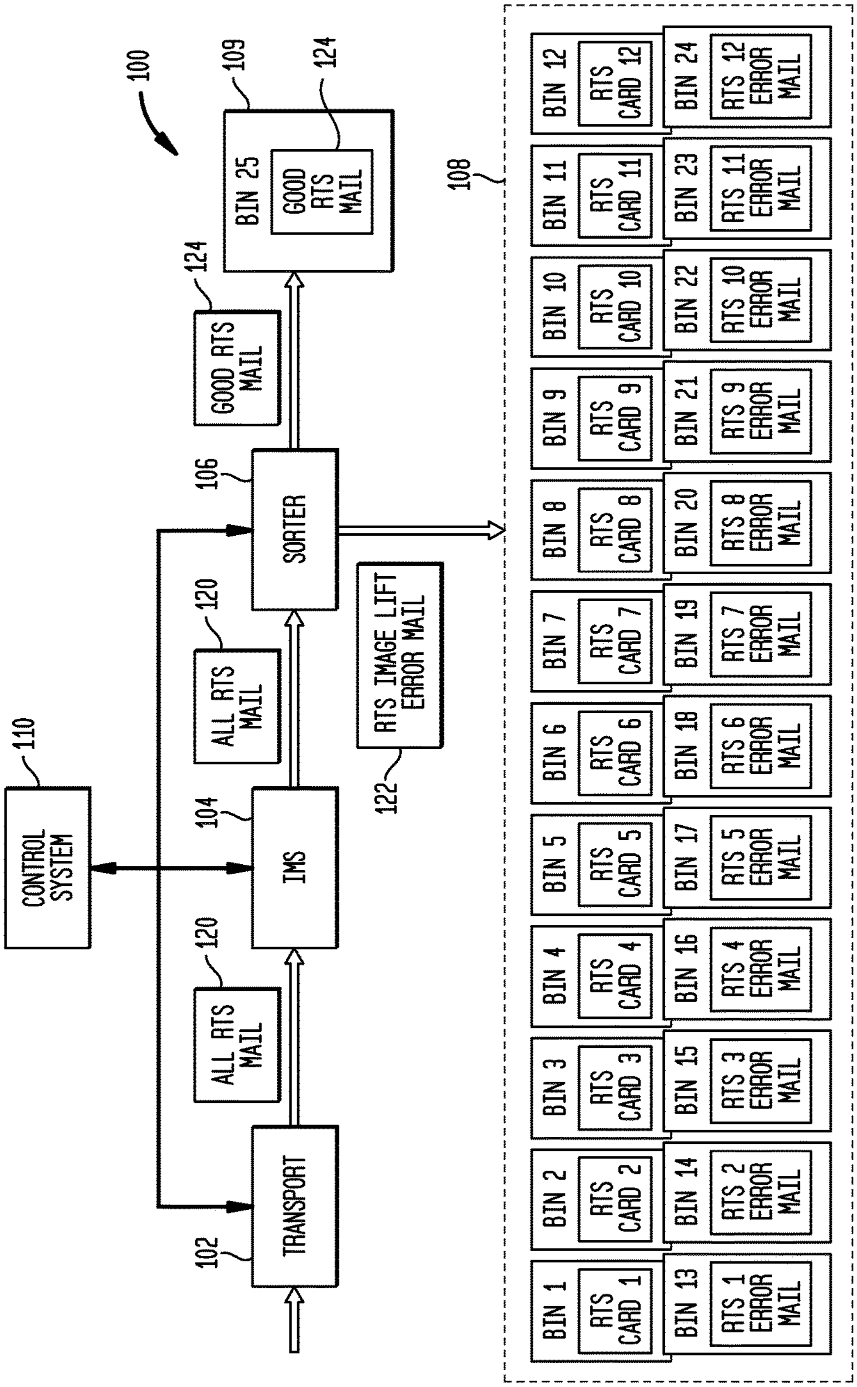
FIG. 1 is an illustration of a mail processing system.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Once mail is identified as RTS mail, the carrier must categorize the RTS mail according to twelve established RTS Reason Codes to be later processed by automation equipment. The RTS mail pieces have to be carefully examined and physically separated into batches by separator cards indicating the Reason Code ("RTS cards"). These batches of RTS mail are shipped back to the large postal facilities for processing and re-labeling using automation equipment. At the postal facilities the RTS mail must be processed separately—on mail processing equipment—using one of the twelve reason codes given by the carrier. If the RTS mail with different reason codes is mixed up, or the RTS cards are misplaced, the RTS mail will be processed incorrectly, which can result in very costly label errors, sorting errors, and cause the RTS mail be processed incorrectly.

According to an exemplary embodiment, RTS Reason Codes include:

| RTS Code | Event Name |
|---|---|
| ANK | Attempted Not Known |
| ILL | Illegible |
| DIS | In Dispute |
| IA | Insufficient Address |
| NSN | No Such Number |
| NSS | No Such Street |
| UTF | Undeliverable As Addressed |
| NMR | No Mail Receptacle |
| UNC | Unclaimed |
| REF | Refused |
| TA | Temporary Away |
| VAC | Vacant |

Of course, other systems, countries, or jurisdictions may use their own codes for similar purposes.

In some RTS processes, the RTS mail is grouped by different reason codes and separated by RTS cards before it is sent back to the processing and distribution centers. Each separator card indicates the RTS reason code for the following RTS mail, using barcodes, printed labels, or other indicia.

When the RTS mail is processed on the mail processing equipment (MPE), the RTS cards are processed along with the mail pieces. The MPE first digitizes and identifies the RTS card to detect the reason code prior to processing the RTS mail. Every RTS mail piece following the separator card, until a new separator card is detected by the MPE, will be digitized and the digital image sent to the image management system (IMS) for processing along with the corresponding detected reason code. Each separator card is sorted to a designated bin by the MPE.

A "good" RTS mail piece is one that is successfully digitized by the MPE and the corresponding image can be transmitted to the IMS and so is sorted to a predetermined corresponding output bin for further standard processing.

However, in the event a mailpiece image cannot be lifted correctly from a mail piece due to other lift errors, this "error mail piece" must follow the RTS card and be sorted to the bin below its separator card. This processing technique requires that the typical MPE reserve a total of twenty-four bins to sort, so that there is one bin for each separator card and a corresponding bin for each set of error mail pieces with that RTS code. Removing the error mail and RTS card from the bins ("sweeping" the bins) is a manual process performed by an operator. The operator must manually correlate the mail in the twelve error bins to the corresponding separator cards in the corresponding bins before the mail can be rerun in a second (or subsequent) pass on the MPE.

The manual matching of the RTS card(s) with the mail introduces human errors during sweeping and slows down the processing. For example, there may be no error mail pieces for one or more of the RTS codes. There are still twelve RTS cards on the top bins, but only some of the lower bins have error mail pieces. The operator has to sweep each of the RTS cards and corresponding error mail pieces in the correct order and correct facing to prepare the RTS cards and mail pieces for the next run on the MPE. If the operator makes an error or stacks an error mail piece incorrectly, at least some of the error mail pieces will be processed incorrectly and may go to the wrong destination or even get destroyed.

The total number of bins used in this example—twenty four bins for twelve RTS card bins and twelve corresponding error mail bins—is for demonstration only. The actual number can vary slightly in the production environment, depending on the RTS type configuration.

FIG. 1 is an illustration of a mail processing system 100. RTS mail handling system, in this example, includes a control system 110 that controls transport 102, image management system (IMS) 104, and sorter 106. The sorter 106 outputs sorted mail pieces and RTS cards to bins 1-25, labeled 108 and 109.

A "deck" of RTS mail, shown as "all RTS mail 120" is transported on transport 102 to image management system (IMS) 104. In a typical RTS processing run, the "deck" would be in the following order, where the card number and the RTS mail number represent RTS reason codes:

1. RTS Card 1
2. RST mail 1 (any number of mail pieces)
3. RTS Card 2
4. RTS mail 2 (any number of mail pieces)
5. RTS Card 3
6. RTS mail 3 (any number of mail piece)
7. (continuing with each RTS card followed by any mail pieces for that RTS reason code)

IMS 104 images each RTS card to identify its RTS code. IMS 104 then images each following RTS mail piece and attempts to "lift" an image from the mail piece image, which may or may not be successful.

The deck of all RTS mail 120 is then sorted at sorter 106. "Good" RTS mail 124, for which there was a successful "lift" of an image, is sorted to a bin 109 or otherwise sent for further transport, since the lift was successful.

RTS image lift error mail 122 (or simply RTS error mail), for which the image could not be successfully lifted, however, requires further processing, and must be sorted so as to remain associated with the respective RTS card.

The sorter sorts each of the RTS error mail 122, include RTS cards and the corresponding RTS error mail pieces, into a plurality of output bins 108. Output bins 108 require an output bin for each specific RTS card (e.g., Bin 1 for RTS Card 1) and a second bin for the RTS error mail that corresponds to the RTS card (e.g., Bin 13 for RTS 1 error mail). That is, for each RTS code being processed, two bins must be assigned, one for the card and one for the corresponding mail pieces.

In this example, with twelve RTS codes being processed, twenty-four output bins 108 are required just for the RTS error mail 122. This is true even if there is no RTS error mail for a given RTS card.

The bins 108 must be manually swept by an operator, who must be sure to keep the separator RTS cards together with the corresponding RTS error mail and in the correct order. For example, the operator must manually group RTS 1 error mail with RTS card 1 and continue through type 12 before the mail can be processed again. Care must be taken to maintain the grouping of the RTS mail with the corresponding separator card for that batch to avoid costly processing errors.

In such a system, errors are common, and even when errors do not occur, the manual process of sweeping the cards and RTS error mail, organizing and facing them correctly, and maintaining the proper order is naturally slow and inefficient. If an error does occur, the mail piece will be processed incorrectly and may go to the wrong destination or even get destroyed. Further, the need for a large number of dedicated output bins to handle each type of RTS card and each corresponding type of RTS error mail can be expensive in general and can slow can cause slowdowns in other processing.

Disclosed embodiments provide improved systems and methods that eliminate the need for this large number of dedicated output bins and reduce any manual handling of RTS mail. According to disclosed embodiments, the IMS automatically manages the RTS separator card reason codes and the RTS mail.

According to disclosed embodiments, the IMS creates a unique profile of a mail-piece using image data, a mail piece identification code (ID) and the reason code for the RTS mail the first time the mail is processed on the MPE. The mail-piece profile is used in the subsequent runs without the separator cards eliminating the need for separator card, and the error prone operation of maintaining the correct grouping of the RTS mail with the corresponding separator cards. Furthermore it eliminates the need to reserve the very valuable 24 bins currently required because of the current RTS processing system.

Techniques as disclosed herein eliminate the need to reserve twenty-four bins on the mail processing system for reason code processing. A process as disclosed requires only two bins—one for all the separator cards, one for all the mail that were previously sorted to the bins below the separator cards. The bins are now made available for other sorting needs and reducing downstream processing, cost and labor.

Disclosed embodiments eliminate the need for the operator to manually group the mail with the separator cards. This reduces the potential human errors significantly.

Disclosed embodiments eliminate the need to re-run the separator cards. This reduces processing load on the MPE and increases the operational productivity.

Figure 2:
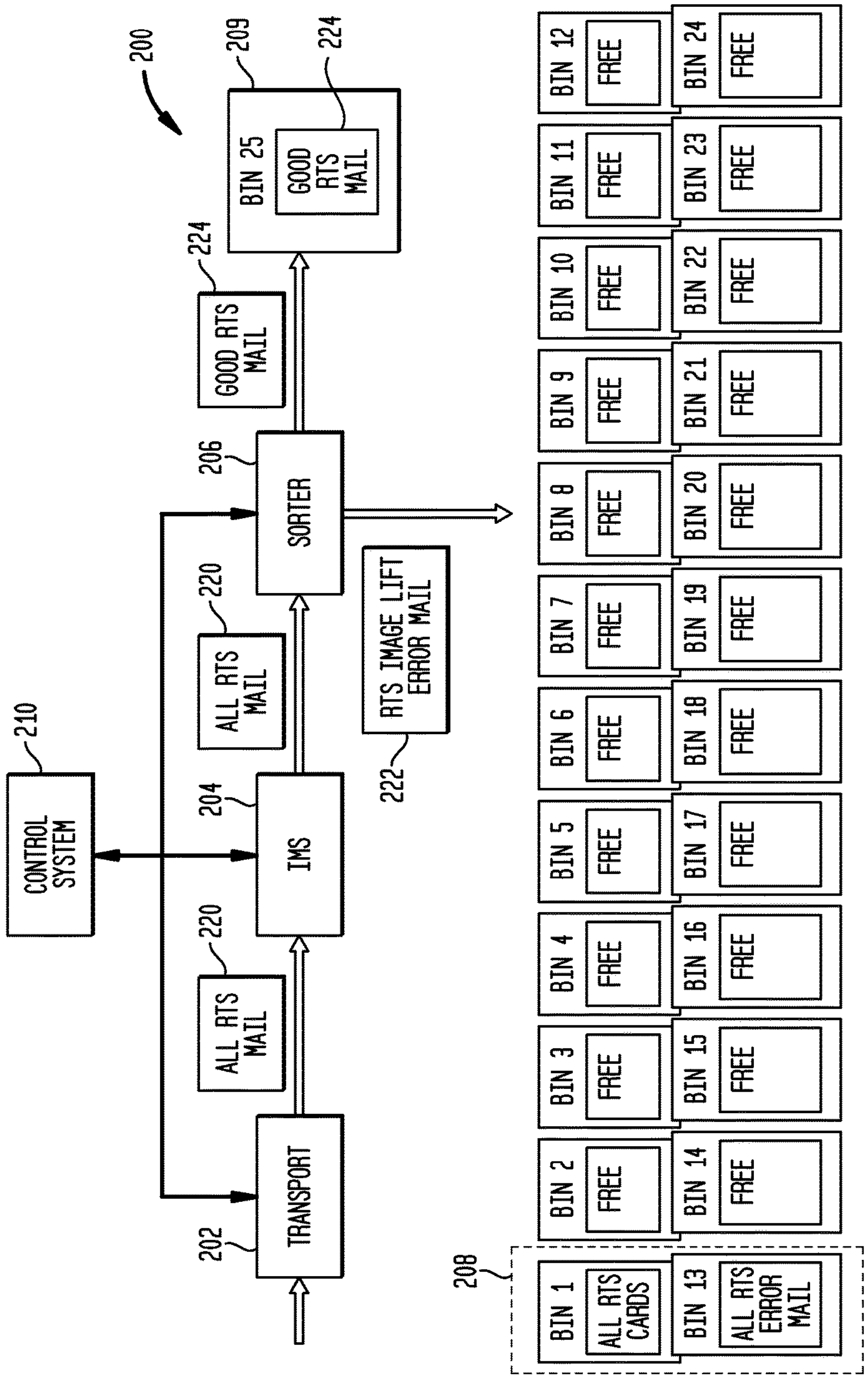
FIG. 2 is an illustration of a mail processing system in accordance with disclosed embodiments.

FIG. 2 is an illustration of a mail processing system 200 in accordance with disclosed embodiments. RTS mail handling system, in this example, includes a control system 210 that controls transport 202, image management system (IMS) 204, and sorter 206. The sorter 206 outputs sorted mail pieces and RTS cards to output bins labeled 208 and 209.

A "deck" of RTS mail, shown as "all RTS mail 220" is transported on transport 202 to image management system (IMS) 204. In a typical RTS processing run, the "deck" would be in the following order, where the card number and the RTS mail number represent RTS reason codes:

8. RTS Card 1
9. RST mail 1 (any number of mail pieces)
10. RTS Card 2
11. RTS mail 2 (any number of mail pieces)
12. RTS Card 3
13. RTS mail 3 (any number of mail piece)
14. (continuing with each RTS card followed by any mail pieces for that RTS reason code)

Note that each of the mail pieces will typically already have an associated mail piece ID, generated when the mail piece was first processed for delivery, before being identified as RTS mail. The mail piece ID is a unique identifier for that mail piece for a period of time, for example for 90 days. The mail piece ID is typically printed, using barcodes or other indicia, on each mail piece and can be read in subsequent processing to identify the mail piece.

IMS 204 images each RTS card to identify its RTS code. IMS 204 then attempts to "lift" an image from RTS mail piece, which may or may not be successful. The image of each mail RTS mail piece, when successfully lifted, is usable for identifying the mail piece, extracting address data, and for other purposes.

For each of RTS error mail piece, the IMS 204 creates a unique RTS mail piece profile of the mail piece using the mail piece ID and the reason code from the preceding RTS card. If no mail piece ID already exists, one can be generated and the RTS mail piece can optionally be labeled or printed with the identification code. The RTS mail piece profile is stored in the control system and can thereafter be used to sort and otherwise process the RTS mail piece without the corresponding RTS card.

The deck of all RTS mail 220 is then sorted at sorter 206. "Good" RTS mail 224, for which there was a successful image lift, is sorted to an output bin 209 or otherwise sent for further transport, since the lift was successful.

RTS image lift error mail 222 (or simply "RTS error mail"), for which the image could not be successfully lifted, is processed per the processes described herein.

The sorter sorts each of the RTS error mail 222, include RTS cards and the corresponding RTS error mail pieces, into output bins 208, typically only two output bins. Output bins 208 can use a single output bin for all RTS cards (e.g., Bin 1 for all RTS Card) and a second single bin for all of the RTS error mail (e.g., Bin 13 for all RTS error mail). That is, all of the RTS error mail, once the RTS mail piece profile has been stored, can be sorted to a single output bin for the cards and a single output bin for the corresponding RTS error mail pieces. The remaining bins, labeled "free" in this example, can be used for other sorting tasks or processes.

When the bins 208 are swept, there is no longer any need to be concerned with keeping the separator RTS cards together with the corresponding RTS error mail or in the correct order. This improves efficiency and eliminates errors.

In subsequent processing of the RTS error mail, the stored RTS mail piece profiles are used to process the RTS mail using the RTS codes stored as part of the profiles. As such, the RTS cards are not needed or used for further processing.

Figure 3:
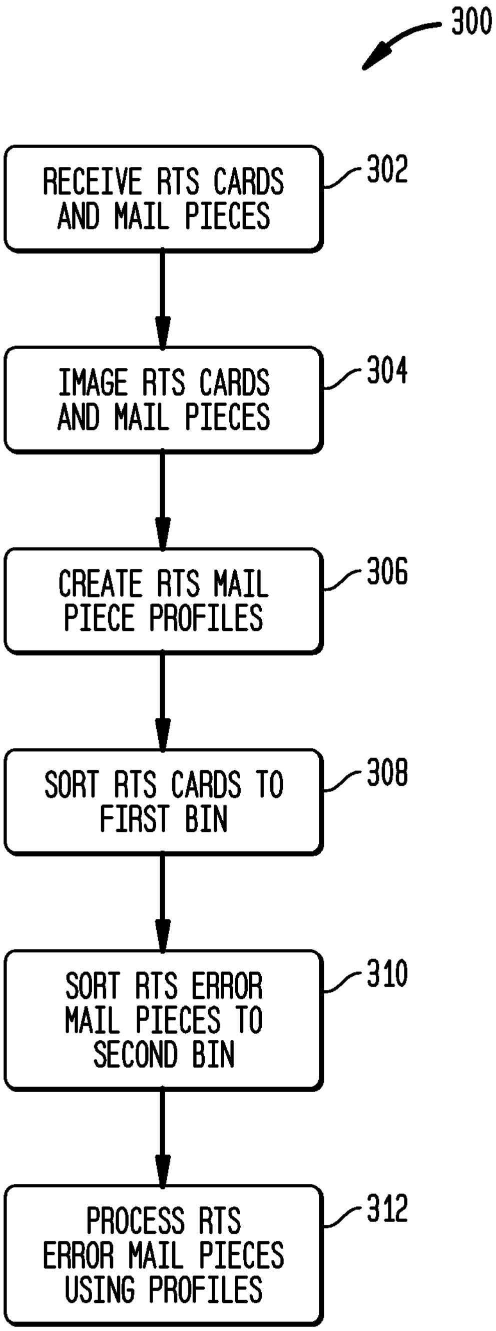
FIG. 3 illustrates a flowchart of a process in accordance with disclosed embodiments.

FIG. 3 illustrates a flowchart of a process 300 in accordance with disclosed embodiments, as may be performed by mail processing equipment such as mail processing system 200, referred to generically as the "system" below.

The system receives a plurality of RTS cards and RTS mail pieces (302). The RTS cards identify return-to-sender reason codes for corresponding ones of the RTS mail pieces.

The system images each RTS mail piece to attempt to produce an image of each RTS mail piece (304).

For each RTS mail piece for an image could not be produced, the system creates and stores a unique RTS mail piece profile of the mail piece using the an mail piece identification code (ID) and a reason code from a preceding RTS card (306).

The system sorts the RTS cards to a first bin (308).

The system sorts the RTS mail pieces for which address data could not be determined (RTS error mail pieces) to a second bin (310).

The system thereafter processes the RTS mail pieces for which address data could not be determined using the corresponding RTS mail piece profiles and without using the RTS cards (312).

Figure 4:
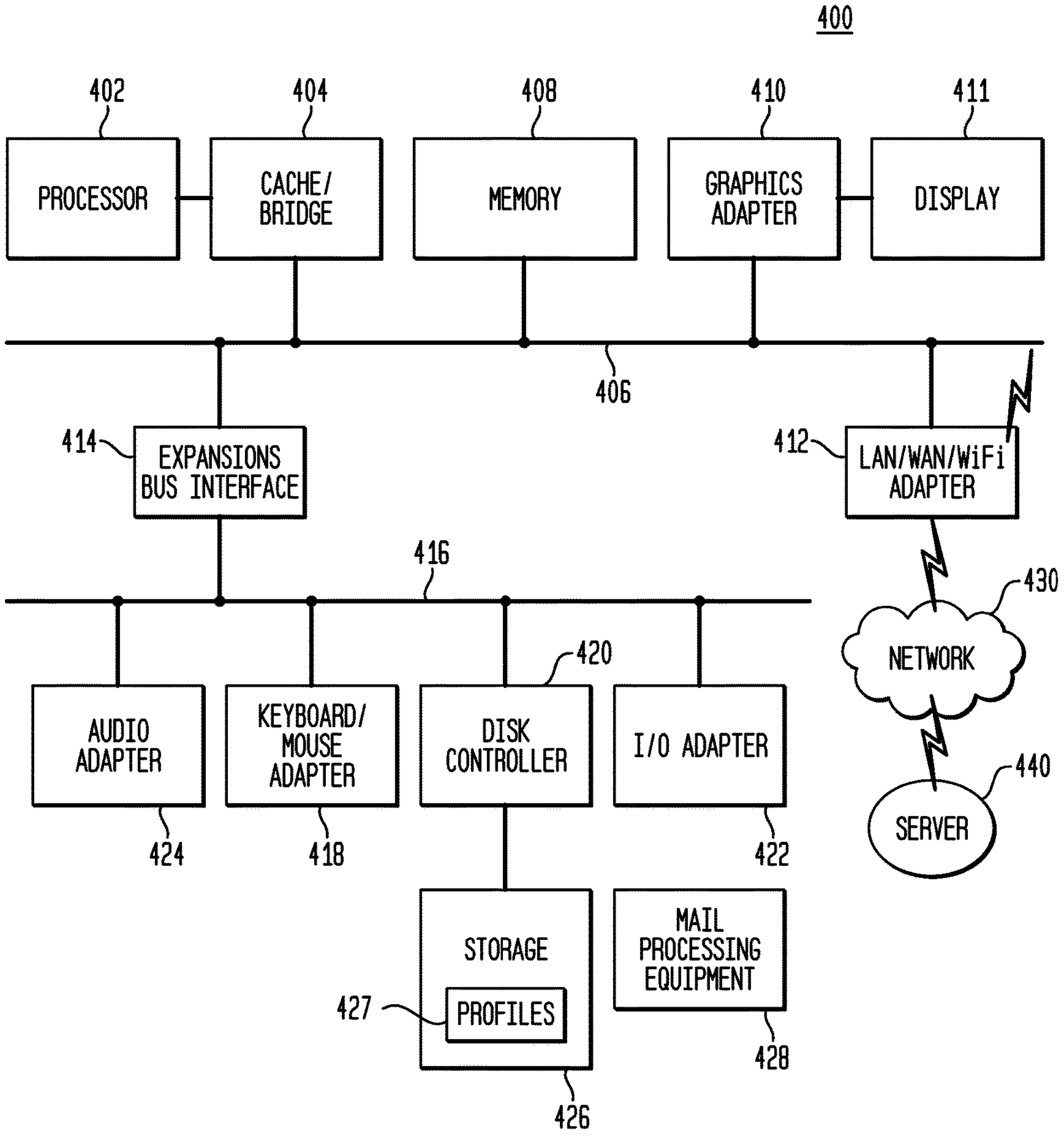
FIG. 4 depicts a block diagram of a data processing system with which an embodiment can be implemented.

FIG. 4 depicts a block diagram of a data processing system 400 with which an embodiment can be implemented, for example as control system 210, or one of the other elements or system described herein, and can be configured to perform processes as described herein. The data processing system depicted includes a processor 402 connected to a level two cache/bridge 404, which is connected in turn to a local system bus 406. Local system bus 406 may be, for example, a peripheral component interconnect (PCI) architecture bus. Also connected to local system bus in the depicted example are a main memory 408 and a graphics adapter 410. The graphics adapter 410 may be connected to display 411.

Other peripherals, such as local area network (LAN)/Wide Area Network/Wireless (e.g. WiFi) adapter 412, may also be connected to local system bus 406. Expansion bus interface 414 connects local system bus 406 to input/output (I/O) bus 416. I/O bus 416 is connected to keyboard/mouse adapter 418, disk controller 420, and I/O adapter 422. Disk controller 420 can be connected to a storage 426, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 436 can store the RTS mail piece profiles discussed herein.

I/O adapter 422 can be connected to mail processing equipment 428, which can include transport or imaging devices, cameras, sorters, output bins, or other hardware devices for processing RTS mail, RTS cards, or other mail items in accordance with the various embodiments described herein.

Also connected to I/O bus 416 in the example shown is audio adapter 424, to which speakers (not shown) may be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 4 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 412 can be connected to a network 430 (not a part of data processing system 400), which can be any public or private data processing system network or combination of networks, as known to those of skill in the art, including the Internet. LAN/WAN/Wireless adapter 412 can also communicate with packages as described herein, and perform other data processing system or server processes described herein. Data processing system 400 can communicate over network 430 with one or more server systems 440, which are also not part of data processing system 400, but can be implemented, for example, as separate data processing systems 400. A server system 440 can be, for example, any of the other systems described herein, and so indicates how systems can intercommunicate over network 430.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method for processing return-to-sender (RTS) mail pieces by a mail processing system, comprising:

receiving a plurality of RTS cards and RTS mail pieces, wherein RTS cards identify RTS reason codes for corresponding ones of the RTS mail pieces;

imaging each RTS mail piece to produce an image;

for each RTS mail piece for which an image could not be produced, creating and storing a unique RTS mail piece profile of that RTS mail piece, wherein the RTS mail piece profile uses an identification code for that RTS mail piece and a reason code from a preceding RTS card;

sorting the RTS cards to a first output bin;

sorting the RTS mail pieces for which an image could not be produced to a second output bin; and thereafter processing the RTS mail pieces for which an image could not be produced using the corresponding RTS mail piece profiles and without using the RTS cards.

2. The method according to claim 1, wherein each RTS mail piece for which an image could be produced is sorted to a third output bin.

3. The method according to claim 1, wherein the plurality of RTS cards is twelve RTS cards, each RTS card identifying a different one of twelve RTS reason codes.

4. The method according to claim 1, wherein each RTS card is imaged to identify an RTS reason code corresponding to following RTS mail pieces.

5. The method according to claim 1, wherein the identification code was previously printed on each RTS mail piece.

6. The method according to claim 1, wherein the identification code for an RTS mail piece is usable to uniquely identify the RTS mail piece.

7. The method according to claim 1, wherein the identification code for each RTS mail piece is read from the RTS mail piece.

8. A mail processing system, comprising:

a transport configured to transport return-to-sender (RTS) cards and RTS mail pieces;

an imager configured to image the RTS cards and RTS mail pieces; and a sorter having a plurality of output bins and configured to sort the RTS mail pieces, wherein the mail processing system is configured to:

receive a plurality of RTS cards and RTS mail pieces, wherein RTS cards identify RTS reason codes for corresponding ones of the RTS mail pieces;

image each RTS mail piece to produce an image;

for each RTS mail piece for which an image could not be produced, create and store a unique RTS mail piece profile of that RTS mail piece, wherein the RTS mail piece profile uses an identification code for that RTS mail piece and a reason code from a preceding RTS card;

sort the RTS cards to a first output bin;

sort the RTS mail pieces for which an image could not be produced to a second output bin; and thereafter process the RTS mail for which an image could not be produced using the corresponding RTS mail piece profiles and without using the RTS cards.

9. The mail processing system of claim 8, wherein each RTS mail piece for which an image could be produced is sorted to a third bin.

10. The mail processing system of claim 8, wherein the plurality of RTS cards is twelve RTS cards, each RTS card identifying a different one of twelve RTS reason codes.

11. The mail processing system of claim 8, wherein each RTS card is imaged to identify an RTS reason code corresponding to following RTS mail pieces.

12. The mail processing system of claim 8, wherein the identification code was previously printed on each RTS mail piece.

13. The mail processing system of claim 8, wherein the identification code for an RTS mail piece is usable to uniquely identify the RTS mail piece.

14. The mail processing system of claim 8, wherein the identification code for each RTS mail piece is read from the RTS mail piece.

* * * * *